(12) United States Patent
Shirriff

(10) Patent No.: US 7,016,946 B2
(45) Date of Patent: Mar. 21, 2006

(54) METHOD AND SYSTEM FOR ESTABLISHING A QUORUM FOR A GEOGRAPHICALLY DISTRIBUTED CLUSTER OF COMPUTERS

(75) Inventor: Kenneth W. Shirriff, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1027 days.

(21) Appl. No.: 09/900,298

(22) Filed: Jul. 5, 2001

(65) Prior Publication Data

US 2003/0023680 A1 Jan. 30, 2003

(51) Int. Cl.
*G06F 15/16* (2006.01)
*G06F 11/00* (2006.01)

(52) U.S. Cl. .................... 709/221; 709/224; 714/4; 714/6

(58) Field of Classification Search ........ 709/220–222, 709/224; 714/4, 6
See application file for complete search history.

(56) References Cited

U.S. PATENT DOCUMENTS

| 5,740,348 | A  | * | 4/1998  | Cunliffe et al. ............... 714/6 |
| 5,999,712 | A  | * | 12/1999 | Moiin et al. ................. 709/221 |
| 6,108,699 | A  | * | 8/2000  | Moiin .......................... 709/221 |
| 6,243,744 | B1 | * | 6/2001  | Snaman et al. .............. 709/220 |
| 6,314,526 | B1 | * | 11/2001 | Arendt et al. .................. 714/4 |
| 6,389,551 | B1 | * | 5/2002  | Yount ............................. 714/4 |
| 6,438,705 | B1 | * | 8/2002  | Chao et al. ..................... 714/4 |
| 6,487,678 | B1 | * | 11/2002 | Briskey et al. ................. 714/4 |

FOREIGN PATENT DOCUMENTS

EP    2001117895    4/2001
EP    1 107 119 A2 *  6/2001
EP    1 146 423 A2 * 10/2001

OTHER PUBLICATIONS

TruCluster Server: Technical Overview: Chapter 3—Connection Manager, Compaq Computer Co., Part No AA-RHGVA-TE, 3-1 thru 3-9, Jul. 1999.*
Publication: "Membership Protocols for Distributed Conference Control", by Bala Rajagopalan, AT&T Bell Laboratories, Computer Communications, Elseview Science Publishers BV, Amsterdam, NL, vol. 18 No. 10, Oct. 1995, pp. 695-708, XP004032441, ISSN: 0140-3664 p. 698, column 1, paragraph 4-p. 703, column 1, paragraph 3.
Publication: "Processor Group Membership Protocols: Specification, Design and Implementation", Jahanian et al., Reliable Distributed Systems, 1993 Proceedings., 12th Symposium on Princeton, NJ, USA 608 Oct. 1993, Los Alamitos, CA, IEEE Comput. Soc, Oct. 6, 1993, pp. 2-11, XP010134701, ISBN: 0-8186-4310-2, p. 2, column 1, paragraph 2, p. 11, solumn 1, paragraph 4.5.

(Continued)

*Primary Examiner*—Patrice Winder
(74) *Attorney, Agent, or Firm*—Park, Vaughan & Fleming LLP; Edward J. Grundler

(57) ABSTRACT

One embodiment of the present invention provides a system that facilitates establishing a quorum for a cluster of computers that are geographically distributed. The system operates by detecting a change in membership of the cluster. Upon detecting the change, the system forms a potential new cluster by attempting to communicate with all other computers within the cluster. The system accumulates votes for each computer successfully contacted. The system also attempts to gain control of a quorum server located at a site separate from all computers within the cluster. If successful at gaining control, the system accumulates the quorum server's votes as well. If the total of accumulated votes is a majority of the available votes, the system forms a new cluster from the potential new cluster.

27 Claims, 4 Drawing Sheets

OTHER PUBLICATIONS

Publication: "The Design and Architecture of the Microsoft Cluster Service, A Practical Approach to High Availability and Scalability", by Vogels et al., Gault-Tolerant Computing, 1998, Digest of Papers, Twenty-Eighth Annual International Symposium on Munich, Germany Jun. 23-25, 1998, Los Alamitos, CA, IEEE Comput. Soc, Jun. 23, 1998, pp. 422-431, XP010291323.

* cited by examiner

METHOD AND SYSTEM FOR ESTABLISHING A QUORUM FOR A GEOGRAPHICALLY DISTRIBUTED CLUSTER OF COMPUTERS

BACKGROUND

1. Field of the Invention

The present invention relates to computer clusters. More specifically, the present invention relates to a method and system for establishing a quorum for a geographically distributed computer cluster.

2. Related Art

Corporate intranets and the Internet are coupling more and more computers together to provide computer users with an ever-widening array of services. Many of these services are provided through the client-server model in which a client communicates with a server to have the server perform an action for the client or provide data to the client. A server may have to provide these services to many clients simultaneously and, therefore, must be fast and reliable.

In an effort to provide speed and reliability within servers, designers have developed clustering systems for the servers. Clustering systems couple multiple computers—also called computing nodes or simply nodes—together to function as a single unit. It is desirable for a cluster to continue to function correctly even when a node has failed or the communication links between the nodes have failed.

In order to accomplish this, nodes of a cluster typically send "heartbeat" messages to each other regularly over private communication links. Failure to receive a heartbeat message from a node for a period of time indicates that either the node has failed or the communication links to the node have failed.

In the event of a failure, the remaining nodes can perform a recovery procedure to allow operations to continue without the failed node. By continuing operations without the failed node, the cluster provides higher availability. Note that when a failure of a node is detected, the surviving nodes must come to an agreement on the cluster membership.

Failures of communication links can cause two problems: "split-brain" and "amnesia," which can be viewed as partitions in space and partitions in time, respectively. The split-brain problem occurs if a communication failure partitions the cluster into two (or more) functioning sub-groups. Each sub-group will not be able to receive heartbeat messages from the nodes in other sub-groups. Potentially, each sub-group could decide that the nodes in the other sub-group have failed, take control of devices normally belonging to the other sub-group, and restart any applications that were running on the other sub-group. The result is that two different sub-groups are trying to control the same devices and run the same applications. This can cause data corruption if one sub-group overwrites data belonging to the other sub-group and application-level corruption because the applications in each sub-group are unaware that another copy of the application is running.

The amnesia problem occurs if one sub-group makes data modifications while the nodes in another sub-group have failed. If the cluster is then restarted with the failed sub-group running and the formerly operational sub-group not running, the data modifications can potentially disappear.

A standard solution to the split-brain problem is to provide a quorum mechanism. Each node in a cluster is assigned a number of votes. All of the operational nodes within a sub-group pool their votes and if the sub-group has a majority of votes it is permitted to form a new cluster and continue operation. For example, in a three-node cluster, each node can be given one vote. If the cluster is partitioned by a network failure into a two-node sub-group and a one-node sub-group, the two-node sub-group has two votes and the one-node sub-group has one vote. Only the two-node sub-group will be permitted to form a new cluster, while the one-node sub-group will cease operation.

With a two-node cluster, it is desired that either node can continue operation if the other node fails. However, the quorum mechanism described above does not permit either node to function alone. If each node has one vote, neither node running alone can achieve a quorum majority. Majority can be attained if, for example, one node gets two votes and the other gets one. This solution allows only the former node to run alone, but will prevent the latter from running alone.

A solution to the two-node quorum problem is to introduce a quorum device, which can be viewed as a vote "tie-breaker." For example, a disk drive, which supports small computer system interface (SCSI) reservations, can be used for a quorum device. The SCSI reservation mechanism allows one node to reserve the disk drive. The other node can then detect that the disk drive has been reserved. In operation, the quorum device is assigned an additional vote. If a network failure partitions the cluster, both nodes will attempt to reserve the SCSI disk. The node that succeeds will obtain the additional vote of the quorum device and will have two out of three votes and will become the surviving cluster member. The other node will have only one vote and thus will not become a cluster member.

Note that the link from a node to the quorum device must be independent of the link between nodes. Otherwise, a single link failure could cause failure of both inter-node communication and communication with the quorum device. In this case, neither node would be able to get two votes and the cluster, as a whole, would fail.

To prevent amnesia, each node keeps a copy of state data. When nodes join a cluster, they get up-to-date state data from the other nodes in the cluster. By requiring a majority of votes, the new cluster will have at least one node that was in the previous cluster, therefore ensuring up-to-date state data within the new cluster.

The previous discussion has assumed that the nodes of the cluster are located physically near each other, so that the nodes can be coupled to each other and to the quorum device through separate links. However, in many cases users wish to have a two-node cluster with nodes that are widely separated, by potentially thousands of miles, in order to provide reliability in the event of a local disaster. This separation poses problems for the quorum configuration. If the quorum device is located with either node, a disaster at that site could destroy both the node and the quorum device, effectively preventing the other node from taking control. In addition, connecting a quorum device such as a SCSI disk over these long distances can be extremely expensive or impossible.

What is needed is a method and system that establishes a quorum for a geographically distributed cluster of computers that eliminates the problems presented above.

SUMMARY

One embodiment of the present invention provides a system that facilitates establishing a quorum for a cluster of computers that are geographically distributed. The system operates by detecting a change in membership of the cluster. Upon detecting the change, the system forms a potential new cluster by attempting to communicate with all other computers within the cluster. The system accumulates votes for each computer successfully contacted. The system also attempts to gain control of a quorum server located at a site separate from all computers within the cluster. If successful at gaining control, the system accumulates the quorum server's votes as well. If the total of accumulated votes is a majority of the available votes, the system forms a new cluster from the potential new cluster.

In one embodiment of the present invention, the system exchanges heartbeat messages with all other computers that are part of the cluster. Upon discovering an absence of heartbeat messages from any computer in the cluster, the system initiates a cluster membership protocol.

In one embodiment of the present invention, detecting the change in cluster membership includes detecting that the cluster has not been formed.

In one embodiment of the present invention, attempting to gain control of the quorum server involves communicating with the quorum server using cryptographic techniques.

In one embodiment of the present invention, the system exchanges a status message with each member of the new cluster. The system updates the local status of the computer to the most recent status available within the status messages.

One embodiment of the present invention provides a system that facilitates establishing a quorum for a cluster of computers that are geographically distributed. The system provides a quorum server at a site separate from a location of any computer within the cluster. The system assigns at least one vote to each computer within the cluster. The system also assigns at least one vote to the quorum server. In operation, the system attempts to establish communications between each pair of computers within the cluster. A count of votes is accumulated at each computer for each computer that responds. The system also attempts to establish control over the quorum server from each computer within the cluster. If control is established over the quorum server, the quorum server's votes are accumulated in the count of votes. The system establishes a quorum when a majority of available votes has been accumulated in the count of votes.

In one embodiment of the present invention, the quorum server grants control to only a first computer attempting to establish control.

In one embodiment of the present invention, the quorum server grants control to only one computer of all computers attempting to establish control based on a pre-established priority list.

In one embodiment of the present invention, votes are assigned so that the quorum includes at least one computer that was in an immediately previous cluster, to ensure that a cluster formed from the quorum has current data.

In one embodiment of the present invention, attempting to establish control over the quorum server involves establishing communications with the quorum server.

In one embodiment of the present invention, establishing communications with the quorum server involves using cryptographic techniques to deter attacks.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Cluster

Figure 1:
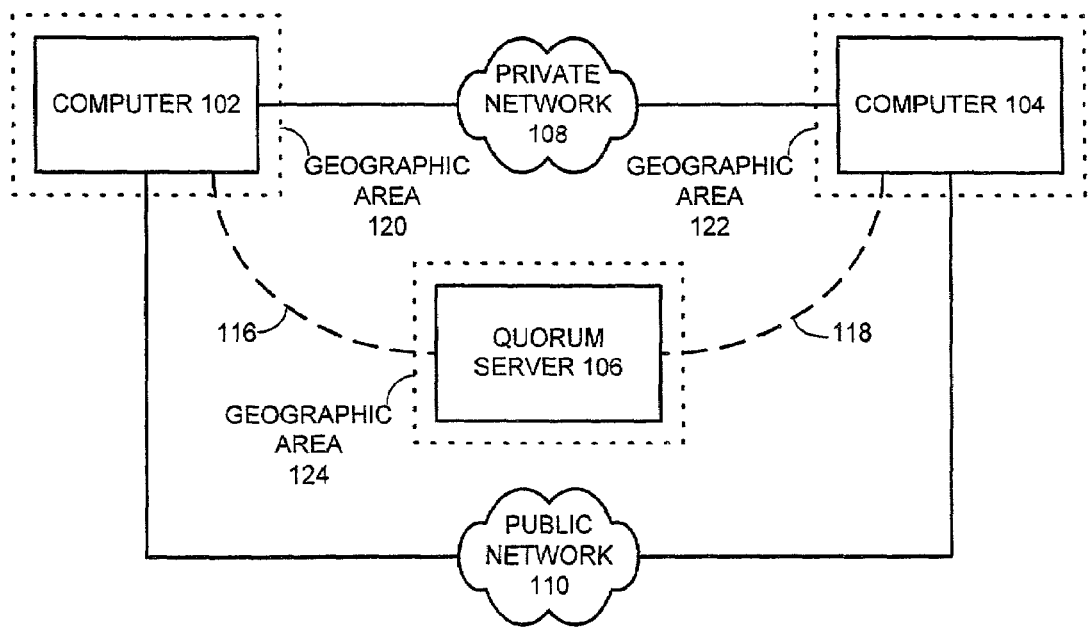
FIG. 1 illustrates a geographically distributed cluster of computers coupled together in accordance with an embodiment of the present invention.

FIG. 1 illustrates a geographically distributed cluster of computers coupled together in accordance with an embodiment of the present invention. Computers 102 and 104 form a cluster of computers that operate in concert to provide services and data to users. Two or more computers are formed into a cluster to provide speed and reliability for the users. Computers 102 and 104 are located in geographic areas 120 and 122 respectively. Geographic areas 120 and 122 are widely separated, possibly by thousands of miles, in order to provide survivability for the cluster in case of a local disaster at geographic area 120 or 122. For example, geographic area 120 may be located in California, while geographic area 122 may be located in New York.

Computers 102 and 104 can generally include any type of computer system, including, but not limited to, a computer system based on a microprocessor, a mainframe computer, a digital signal processor, a portable computing device, a personal organizer, a device controller, and a computational engine within an appliance.

Computers 102 and 104 communicate across private network 108. Private network 108 may include at least two independent links of communication between computers 102 and 104 to provide redundancy to allow uninterrupted communications in case one of the links fails. Private network 108 can generally include any type of wire or wireless communication channel capable of coupling together computing nodes. This includes, but is not limited to, a local area network, a wide area network, or a combination of networks.

Computers 102 and 104 are also coupled to public network 110 to allow communication with users. Public network 110 can generally include any type of wire or wireless communication channel capable of coupling together computing nodes. This includes, but is not limited to, a local area network, a wide area network, or a combination of networks. In one embodiment of the present invention, public network 110 includes the Internet.

Quorum server 106 provides quorum services to computers 102 and 104. Additionally, quorum server 106 can provide quorum services to other clusters of computers independent of computers 102 and 104. Quorum server 106 is located in geographic area 124, which is separate from geographic areas 120 and 122. For example, geographic area 124 may be located in Illinois.

Quorum server 106 can generally include any type of computer system, including, but not limited to, a computer system based on a microprocessor, a mainframe computer, a digital signal processor, a portable computing device, a personal organizer, a device controller, a computational engine within an appliance, and a cluster of computers. There may also be multiple quorum servers at different sites.

Computers 102 and 104 communicate with quorum server 106 across communication links 116 and 118 respectively. Communication links 116 and 118 can be low bandwidth communication links such as dial-up modem connections. Communication links 116 and 118 are typically used only during configuration or re-configuration of the cluster. These links may also be the same network as public network 110, e.g., the Internet.

Cluster Failures

Figure 2:
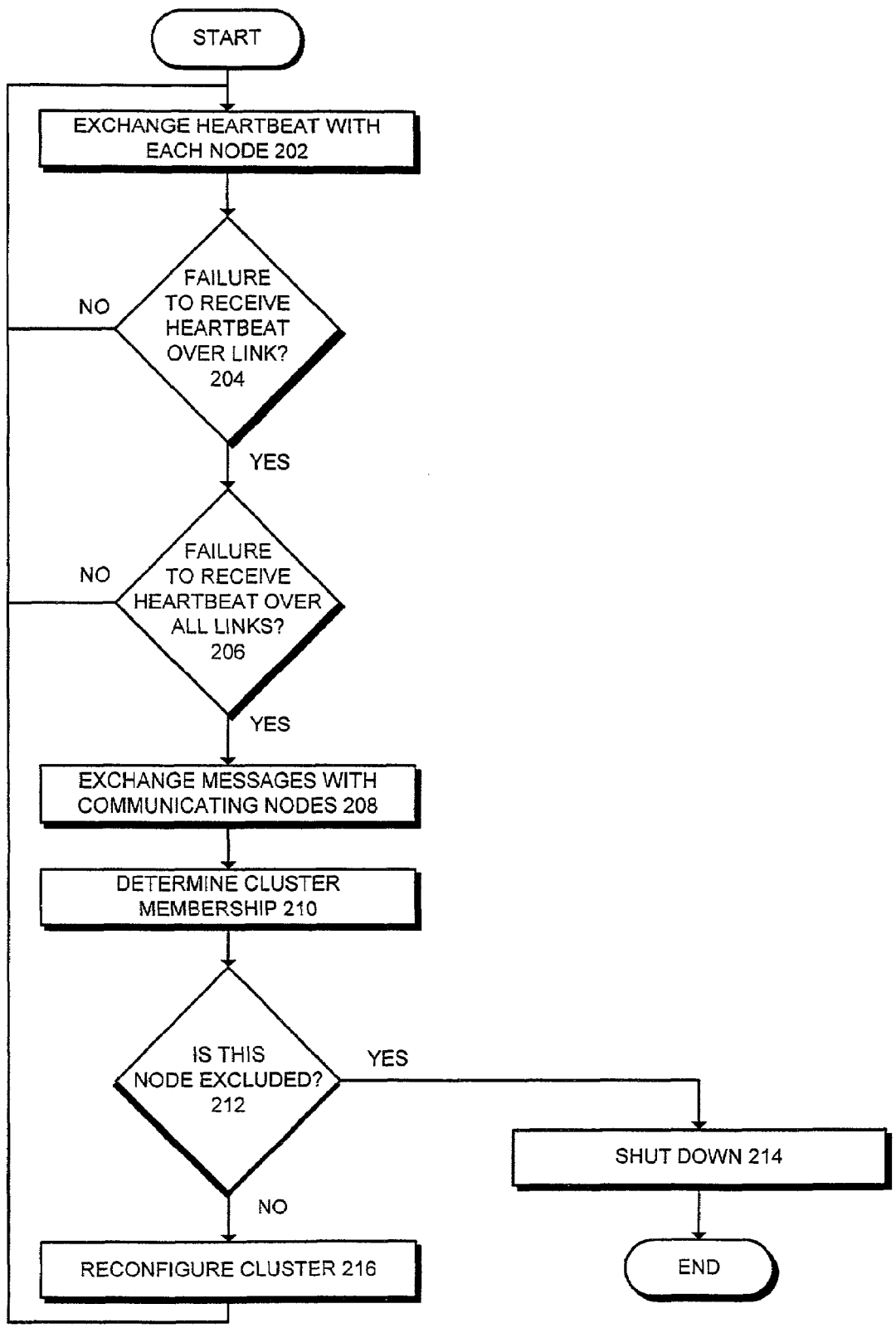
FIG. 2 is a flowchart illustrating the process of detecting and processing a failure within a cluster in accordance with an embodiment of the present invention.

FIG. 2 is a flowchart illustrating the process of detecting and processing a failure within a cluster in accordance with an embodiment of the present invention. The system starts when a computer, say computer 102, exchanges a heartbeat message with every other node in the cluster (step 202). Next, computer 102 checks for a failure to receive heartbeats via one of the links on private network 108 (step 204). If there are no link failures, the process returns to 202 to repeat exchanging heartbeat messages.

If computer 102 detects a failure in the links to another node on private network 108, computer 102 determines if all links to the other node have failed to provide heartbeats (step 206). If all links to the other node have not failed, the process returns to 202 to repeat exchanging heartbeat messages. Otherwise, either all links have failed, or the other node has failed.

If computer 102 detects that all links to the other node have failed to provide heartbeats, computer 102 attempts to exchange messages with other communicating nodes to initiate a cluster membership protocol (step 208). The surviving nodes then co-operate to determine membership for a new cluster (step 210). Details of determining membership for the new cluster are described below in conjunction with FIG. 3.

After determining cluster membership, computer 102 determines if computer 102 was excluded from membership (step 212). If computer 102 was excluded from membership, computer 102 shuts down (step 214). Otherwise, computer 102 reconfigures (step 216). Details of how computer 102 reconfigures are described below in conjunction with FIG. 5. The reconfiguration algorithm ensures that each computer reaches consistent membership decisions, therefore, each computer will either be part of the new cluster or will shut down.

Determining Cluster Membership

Figure 3:
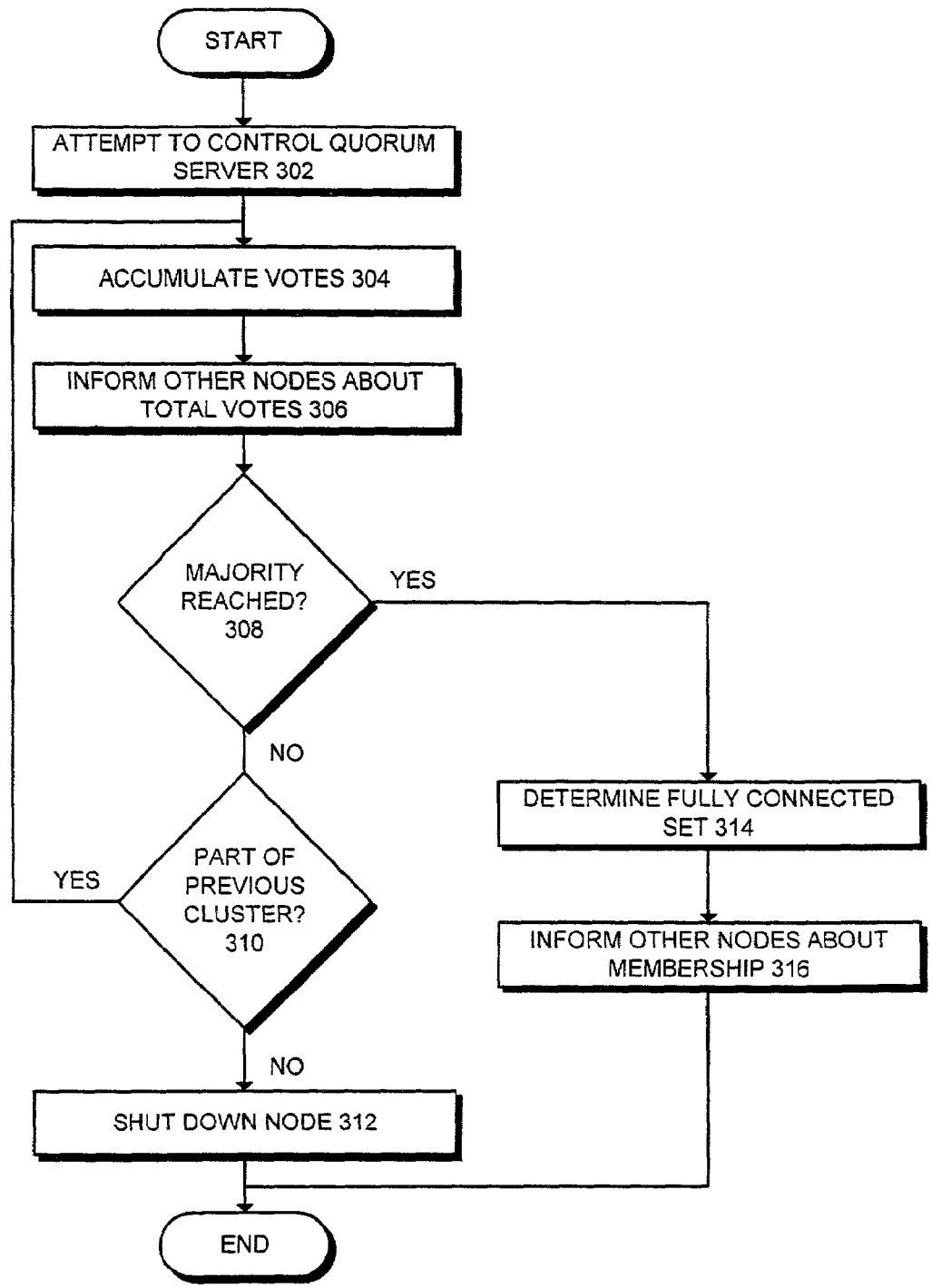
FIG. 3 is a flowchart illustrating the process of determining cluster membership in accordance with an embodiment of the present invention.

FIG. 3 is a flowchart illustrating the process of determining cluster membership in accordance with an embodiment of the present invention. The system starts when a computer, for example computer 102, attempts to take control of quorum server 106 (step 302). Whether successful or not, computer 102 accumulates votes from all other computers contacted plus, if computer 102 successfully took control of quorum server 106, the votes of quorum server 106 (step 304).

Next computer 102 informs all other nodes how many votes have been attained (step 306). Computer 102 then determines if the group has captured the majority of votes (step 308). If the majority of votes have not been captured, computer 102 determines if it was part of the previous cluster (step 310). If computer 102 was part of the previous cluster, the process returns to step 304 and continues to accumulate votes, otherwise, computer 102 shuts down (step 312).

If a majority of votes have been captured at 308, computer 102 determines a fully connected set of the responding computers (step 314). Computer 102 uses well-known graphing techniques to determine a fully connected set of responding computers, therefore this process will not be discussed further.

After a fully connected set of computers has been determined, computer 102 informs the other nodes of the membership of the new cluster (step 316). Note that the above steps are being accomplished by all computers in the system simultaneously.

Controlling Quorum Server

Figure 4:
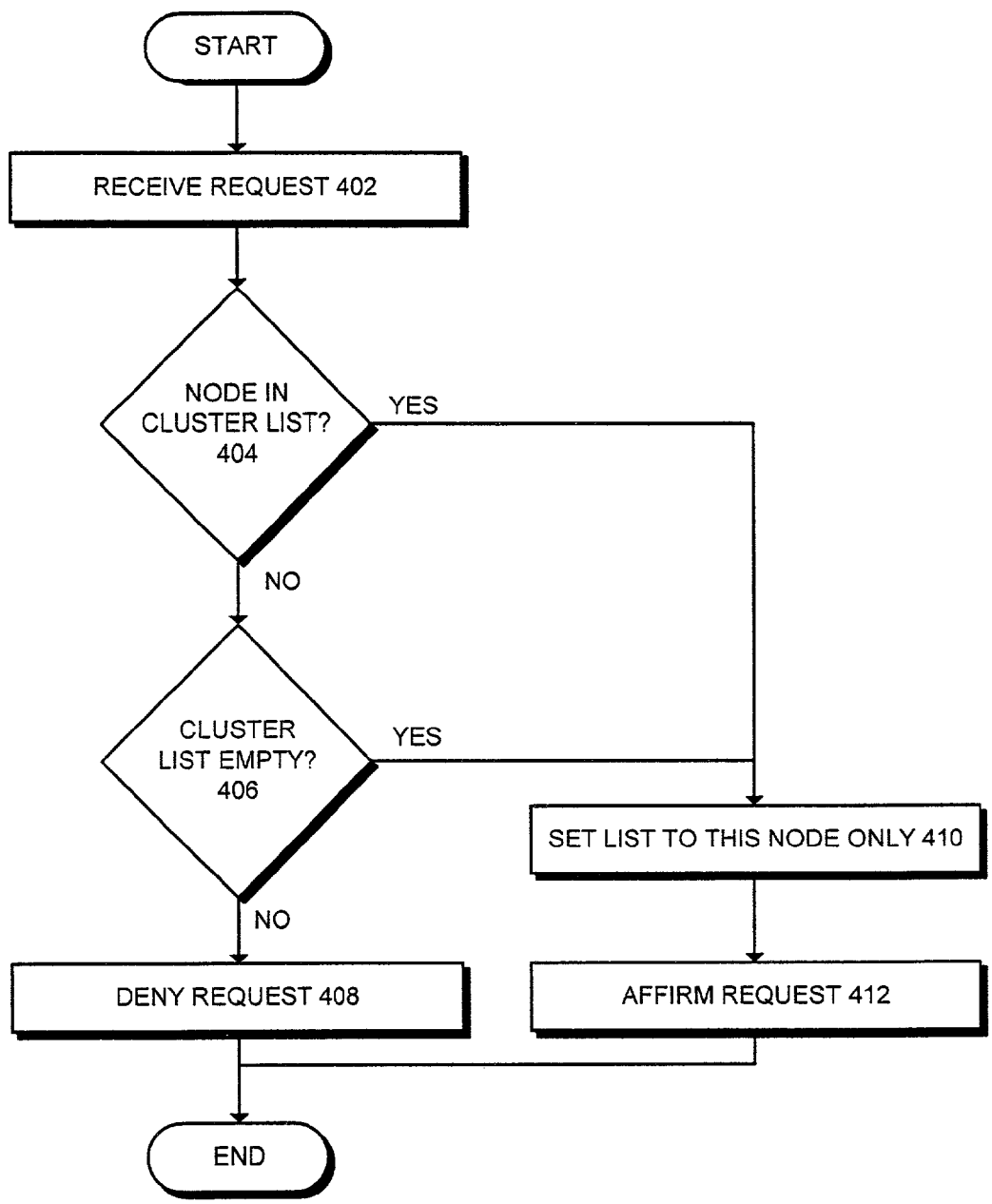
FIG. 4 is a flowchart illustrating the process of granting control of quorum server 106 in accordance with an embodiment of the present invention.

FIG. 4 is a flowchart illustrating the process of granting control of quorum server 106 in accordance with an embodiment of the present invention. The system starts when quorum server 106 receives a request for control from a node in the proposed new cluster (step 402). Next, quorum server 106 determines if the requesting node was on the list of nodes for the previous cluster (step 404). If the requesting node was not on the list of nodes for the previous cluster, quorum server 106 determines if the list of nodes for the previous cluster is empty (step 406). Note that an empty list indicates that a cluster had never been formed and this request is part of initializing a cluster for the first time. If the cluster list is not empty at 406, quorum server 106 denies the request to control quorum server 106 (step 408).

If the node was on the previous cluster list at 404 or if the cluster list is empty at 406, quorum server 106 sets the cluster list to contain only the requesting node (step 410). Note that it will be obvious to a person of ordinary skill in the art that there are other ways to reset the list, including receiving a list of nodes from the requesting node to include in the list or receiving a list of nodes from the requesting node to exclude from the list. Finally, quorum server 106 affirms the request to control quorum server 106 and grants its votes to the requesting node (step 412).

Reconfiguring a Computer

Figure 5:
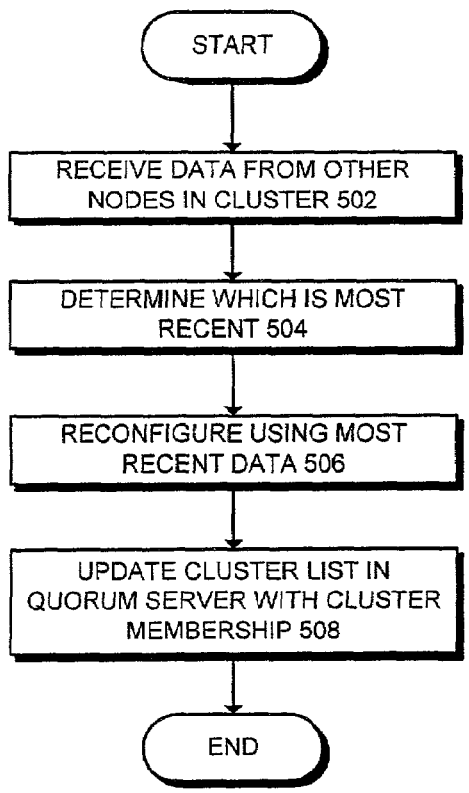
FIG. 5 is a flowchart illustrating the process of reconfiguring a computer within a cluster in accordance with an embodiment of the present invention.

FIG. 5 is a flowchart illustrating the process of reconfiguring a computer within a cluster in accordance with an embodiment of the present invention. The system starts when a computer, say computer 102, receives status data from other nodes in the new cluster (step 502). Next, computer 102 determines which set of status data is the most recent (step 504).

Computer 102 updates its own internal status to conform with the most recent status data available (step 506). Finally, computer 102 informs quorum server 106 which nodes to include in the new cluster list (step 508).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates establishing a quorum for a cluster within a plurality of computers that are geographically distributed, the method comprising:
   detecting a change in membership of the cluster at a computer within the plurality of computers; and
   upon detecting the change in membership,
      forming a potential new cluster by attempting to communicate with all other computers within the plurality of computers,
      accumulating votes for each computer successfully contacted,
      attempting to gain control of a quorum server located at a site that is geographically separate from all computers within the plurality of computers,
      if successful, accumulating the quorum server's votes, and
      if a total of accumulated votes includes a majority of available votes, forming a new cluster from the potential new cluster.

2. The method of claim 1, wherein detecting the change in membership involves:
   exchanging heartbeat messages with all computers that are part of the cluster; and
   upon discovering an absence of heartbeat messages from any computer in the cluster, initiating a cluster membership protocol.

3. The method of claim 1, wherein detecting the change in cluster membership includes detecting that the cluster has not been formed.

4. The method of claim 1, wherein attempting to gain control of the quorum server involves communicating with the quorum server using cryptographic techniques.

5. The method of claim 1, further comprising:
   exchanging a status message with each member of the new cluster; and
   updating a local status at the computer to a most recent status available within the status message.

6. A method that facilitates establishing a quorum for a cluster within a plurality of computers that are geographically distributed, the method comprising:
   providing a quorum server at a site that is geographically separate from a location of a computer within the plurality of computers;
   assigning at least one vote to each computer within the plurality of computers;
   assigning at least one vote to the quorum server;
   attempting to establish communications between each pair of computers within the plurality of computers;
   accumulating a count of votes for each computer communicated with at each computer;
   attempting to establish control over the quorum server from each computer within the plurality of computers;
   if control is established over the quorum server, accumulating the quorum server's votes in the count of votes; and
   establishing the quorum when a majority of available votes has been accumulated in the count of votes.

7. The method of claim 6, wherein the quorum server grants control to only a first computer attempting to establish control.

8. The method of claim 6, wherein the quorum server grants control to only one computer of all computers attempting to establish control based on a pre-established priority list.

9. The method of claim 6, wherein votes are assigned so that the quorum includes at least one computer that was in an immediately previous cluster, to ensure that a cluster formed from the quorum has current data.

10. The method of claim 6, wherein attempting to establish control over the quorum server involves establishing communications with the quorum server.

11. The method of claim 10, wherein establishing communications with the quorum server involves using cryptographic techniques.

12. A computer-readable storage medium storing instructions that when executed by a computer cause the computer to perform a method that facilitates establishing a quorum for a cluster within a plurality of computers that are geographically distributed, the method comprising:
   detecting a change in membership of the cluster at a computer within the plurality of computers; and
   upon detecting the change in membership,
      forming a potential new cluster by attempting to communicate with all other computers within the plurality of computers,
      accumulating votes for each computer successfully contacted,
      attempting to gain control of a quorum server located at a site that is geographically separate from all computers within the plurality of computers,
      if successful, accumulating the quorum server's votes, and
      if a total of accumulated votes includes a majority of available votes, forming a new cluster from the potential new cluster.

13. The computer-readable storage medium of claim 12, wherein detecting the change in membership involves:
   exchanging heartbeat messages with all computers that are part of the cluster; and
   upon discovering an absence of heartbeat messages from any computer in the cluster, initiating a cluster membership protocol.

14. The computer-readable storage medium of claim 12, wherein detecting the change in cluster membership includes detecting that the cluster has not been formed.

15. The computer-readable storage medium of claim 12, wherein attempting to gain control of the quorum server involves communicating with the quorum server using cryptographic techniques.

16. The computer-readable storage medium of claim 12, the method further comprising:
   exchanging a status message with each member of the new cluster; and
   updating a local status at the computer to a most recent status available within the status message.

17. A computer-readable storage medium storing instructions that when executed by a computer cause the computer to perform a method that facilitates establishing a quorum for a cluster within a plurality of computers that are geographically distributed, the method comprising:

providing a quorum server at a site that is geographically separate from a location of a computer within the plurality of computers;

assigning at least one vote to each computer within the plurality of computers;

assigning at least one vote to the quorum server;

attempting to establish communications between each pair of computers within the plurality of computers;

accumulating a count of votes for each computer communicated with at each computer;

attempting to establish control over the quorum server from each computer within the plurality of computers;

if control is established over the quorum server, accumulating the quorum server's votes in the count of votes; and establishing the quorum when a majority of available votes has been accumulated in the count of votes.

18. The computer-readable storage medium of claim 17, wherein the quorum server grants control to only a first computer attempting to establish control.

19. The computer-readable storage medium of claim 17, wherein the quorum server grants control to only one computer of all computers attempting to establish control based on a pre-established priority list.

20. The computer-readable storage medium of claim 17, wherein votes are assigned so that the quorum includes at least one computer that was in an immediately previous cluster, to ensure that a cluster formed from the quorum has current data.

21. The computer-readable storage medium of claim 17, wherein attempting to establish control over the quorum server involves establishing communications with the quorum server.

22. The computer-readable storage medium of claim 21, wherein establishing communications with the quorum server involves using cryptographic techniques.

23. A system that facilitates establishing a quorum for a cluster within a plurality of computers that are geographically distributed, comprising:

the plurality of computers;

a network coupling the plurality of computers;

a quorum server located at a site that is geographically separate from any one computer of the plurality of computers, wherein the quorum server provides one or more votes to a computer within the plurality of computers that is attempting to form a quorum; and an independent communications link coupling each computer of the plurality of computers and the quorum server.

24. The system of claim 23, wherein the quorum server includes a mechanism for granting control to only one computer of the plurality of computers requesting control.

25. The system of claim 23, wherein the quorum server includes a mechanism for maintaining a list of computers accepted into the cluster.

26. The system of claim 23, wherein the quorum server includes a mechanism for cryptographically ensuring an identity of a computer attempting to establish control.

27. The system of claim 23, wherein the quorum server includes monitoring means to monitor the status of each computer within the plurality of computers.

* * * * *